(12) United States Patent
Lasneski

(10) Patent No.: US 6,989,823 B1
(45) Date of Patent: Jan. 24, 2006

(54) METHOD AND APPARATUS FOR NOISE REDUCTION USING CAPTURED IMAGES

(75) Inventor: Alan Lasneski, Turner, OR (US)

(73) Assignee: InFocus Corporation, Wilsonville, OR (US)

( * ) Notice: Subject to any disclaimer, the term of this patent is extended or adjusted under 35 U.S.C. 154(b) by 122 days.

(21) Appl. No.: 09/653,613

(22) Filed: Aug. 31, 2000

(51) Int. Cl.
G09G 5/00 (2006.01)
(52) U.S. Cl. ............... 345/204; 345/214; 345/531; 345/545; 382/236
(58) Field of Classification Search .............. 345/204, 345/210–211, 214, 537–538, 530–51, 534–535, 345/589, 591, 593, 543–545, 547, 569, 531; 348/536–544, 556, 500–501; 327/113, 115; 382/236
See application file for complete search history.

(56) References Cited

U.S. PATENT DOCUMENTS

| | | | | |
|---|---|---|---|---|
| 4,673,981 A | * | 6/1987 | Lippman et al. | 348/441 |
| 5,519,790 A | * | 5/1996 | Manning | 348/415.1 |
| 5,541,646 A | * | 7/1996 | Huang | 348/177 |
| 5,606,373 A | * | 2/1997 | Dopp et al. | 348/459 |
| 5,627,765 A | * | 5/1997 | Robotham et al. | 708/203 |
| 5,754,700 A | * | 5/1998 | Kuzma | 375/240.24 |
| 5,767,916 A | | 6/1998 | West | |
| 5,805,233 A | | 9/1998 | West | |
| 5,875,262 A | | 2/1999 | Asada | |
| 5,995,095 A | | 11/1999 | Ratakonda | |
| 6,014,183 A | * | 1/2000 | Hoang | 348/700 |
| 6,055,018 A | * | 4/2000 | Swan | 348/447 |
| 6,104,831 A | * | 8/2000 | Ruland | 348/152 |
| 6,157,412 A | * | 12/2000 | Westerman et al. | 348/446 |
| 6,351,556 B1 | | 2/2002 | Loui et al. | |
| 6,389,168 B2 | | 5/2002 | Altunbasak et al. | |

FOREIGN PATENT DOCUMENTS

GB 2349031 A * 7/2000

* cited by examiner

*Primary Examiner*—Vijay Shankar
*Assistant Examiner*—Leonid Shapiro
(74) *Attorney, Agent, or Firm*—Alleman Hall McCoy Russell & Tuttle LLP

(57) ABSTRACT

A method for reducing phase noise and distortion in a digitally converted image in which only a selected subset of the video frames that represent the image are displayed. The selected subset is comprised of reference video frames, where a new reference frame is captured for display after determining that a pixel of an inbound video frame exceeds a certain threshold of change as compared to a corresponding pixel of a previously captured reference frame. The pixel comparison is performed by comparing corresponding numerical values representing each of the pixel's color values, red, green, and blue, or by comparing corresponding numerical values representing a composite color value. The threshold determination is performed by comparing the absolute value of the difference between each of the corresponding pixel values to a pre-selected change threshold value. After determining that the threshold has been exceeded, the next consecutive inbound frame is captured and stored in a frame buffer memory as a new reference frame. All of the stored reference frames are transmitted from the frame buffer memory for display to a display object in accordance with the display object's frame refresh rate. The threshold value is pre-selected to eliminate the intervening sub-threshold inbound frames causing the phase noise and distortion, which not only improves the quality of the displayed image but also reduces the total number of new frames that must be transmitted to the display object.

5 Claims, 9 Drawing Sheets

| Frame Advance 58 | Line Advance 55 | HPC (Horizontal Position Counter) 105 1 2 3 4 5 6 7 ......  | Pixel Value Comparison 115 | Action |
|---|---|---|---|---|
| 1 | Line 1<br>2<br>3<br>4<br>5 | 0 0 FF 0 0 0 0 0 FF 0<br>1 2 FC 1 0 1 0 0 FE 2<br>0 2 FE 0 1 2 0 3 FF 2<br>3 4 FC 2 3 [2] 0 FC 3 4<br>3 4 FC 3 3 FF [3] FC 0 2 | — | Store Reference Frame 175 |
| 2 | Line 1<br>2<br>3<br>4<br>5 | 0 0 FC 0 0 0 0 FC 0 0<br>1 2 FD 2 0 2 0 FB 1 3<br>0 2 FF 0 1 3 0 FD 3 2<br>3 4 FC 2 2 [3] 0 FB 3 4<br>3 4 FB 2 3 FF [3] FC 0 2 | [2 - 3] = 1<br>[3 - 3] = 0 | No Change 176 |
| . . . . . | | | | No Change 176 |
| 3232 | Line 1<br>2<br>3<br>4<br>5 | 3 3 FC 0 0 0 0 FC 0 3<br>1 3 FD 2 0 2 0 FB 3 1<br>0 2 FC 0 3 3 0 FC 3 4<br>3 4 FB 2 1 [FF] 0 FB 0 2<br>3 4 FB 2 3 FF [FF] FC 1 2 | [3 - FF]=FC<br>[3 - FF]=FC | Set on reference frame capture 115 |
| 3233 | Line 1 | 5 5 FF 2 3 2 3 FF 1 3 | — | Store Reference Frame 175 |

FIG. 10

INBOUND PIXEL 201

| R | 245 |
| G | 200 |
| B | 87 |

REFERENCE (STORED) PIXEL 202

| R | 241 |
| G | 204 |
| B | 200 |

203 → R | 245 − 241 | = 4 → False  
204 → G | 200 − 204 | = 4 → False  
205 → B | 87 − 200 | = 113 → True

METHOD AND APPARATUS FOR NOISE REDUCTION USING CAPTURED IMAGES

BACKGROUND OF THE INVENTION

1. Field of the Invention

The present invention relates generally to reducing phase noise and distortion in the conversion of an analog video signal to a digital video signal. In particular, the present invention is directed to technology that reduces phase noise and distortion in the digitally converted image by selectively capturing reference frames of the image in accordance with a change threshold.

2. Background Information

Presentations using multimedia projection display systems have become popular for purposes such as sales demonstrations, business meetings, and classroom sessions. In a common mode of operation, multimedia projection display systems receive analog video signals from a multimedia device such as a personal computer (PC). The video signals represent still, partial-, or full-motion display images of the type rendered by the PC. The analog video signals are converted into digital video signals to control a digitally-driven display object, such as a transmissive liquid crystal display (LCD) or digital mirror device (DMD), to form the display images for projection onto a display screen.

Two common types of multimedia projection display systems are LCD projectors and LCD projection panels. An LCD projector includes a transmissive LCD, a light source, and projection optics to form and project display images in the manner described above. An LCD projection panel includes a similar transmissive LCD to form the display image, but operates with a conventional overhead projector (OHP) having a light source and projection optics, to project the display image onto a display screen. Examples of such LCD projectors and LCD projection panels are sold under the respective trademarks LITEPRO and PANELBOOK by In Focus Systems, Inc. of Wilsonville, Oreg., the assignee of the present application.

Because the LCDs and DMDs used in multimedia projection display systems require digital video signals, the multimedia projection display system normally has an analog to digital (A/D) signal converter for converting the PC-generated analog video signals into a digital format suitable for driving the LCD, DMD or other type of display object.

The PC-generated analog video signal is actually comprised of three analog image data signals, one for each of the primary colors, red, green and blue, and a digital timing signal, which may include a pulsed horizontal synchronizing signal ($H_{sync}$) as well as a pulsed vertical synchronizing signal ($V_{sync}$), or a composite sync signal. The individual analog image data signals representing the colors are generated from bit data in a memory portion of the PC, using three digital-to-analog (D/A) converters, one for each of the colors, red, green, and blue.

A complete image is typically displayed during a time interval known as a "video frame period." With reference to FIG. 4, each video frame 9 is usually produced to have a central active video region 11 surrounded by an inactive ("blanked") margin 13. The central active video region 11 is composed of a number of horizontal and vertical picture elements (pixels), typically ranging from 640×480 pixels to 1600×1200 pixels, referred to as the display resolution mode. As the image changes the pixels are activated on and off, with the central active video region 11 being refreshed at rates of 60 to 100 Hz, as dictated by the constraints of the display object (e.g. the LCD, DMD, etc.) used in the multimedia projection display system. Since compatibility with the various PC display resolution modes is a desirable feature for multimedia projection display systems, the A/D signal converter typically includes an interface that is capable of converting analog video signals having a variety of resolution modes.

The A/D signal converter is usually combined with a phase-locked loop (PLL), which may comprise a phase comparator, a low-pass loop filter, and a voltage-controlled oscillator (VCO) formed in a loop to generate a feedback signal that locks into the $H_{sync}$ pulsed horizontal synchronizing signal. In order to generate a selected multiple n of pixel clock pulses for each period of $H_{sync}$, a divide-by-n counter is added to the feedback loop between the VCO output and the phase comparator.

An example of a pixel clock waveform 4 is shown in FIG. 1. The number n of individual pixel clock pulses per $H_{sync}$ pulse may be set by reference to the resolution mode of the analog video source. To set the resolution mode, certain characteristics of the analog video signal, such as $H_{sync}$ and $V_{sync}$, may be used to refer to a resolution mode look-up table stored in the projection display system's CPU. The number n should be set to equal the number of pixel data components in each horizontal line of the scanned analog signal, including those in the central active video region 11 and the blanked margin regions 13 (see FIG. 4) on either side of the central active video region 11. For example, for a screen resolution of 640×480, the number n may be set at about 800 to include the blanked regions 13 on either side of the 640 pixel-wide central active video region 11. Thus, the pixel clock would sample the continuous stream of analog image data 800 times along each horizontal line of the frame.

FIG. 1 further shows the desired relationship between the analog video data signal 1 and the pixel clock signal 4. The number n of pixel clocks 5 is set to establish a one-to-one relationship between pixel clock pulses 5 and pixel data components 2 of the analog data signal 1. This one-to-one relationship requires that the pixel clock signal frequency be equal to the analog video data signal frequency. Under this relationship, each pixel data component 2 of the analog signal is sampled by a single pixel clock pulse 5, which reads the instantaneous voltage value of the pixel data component so that it can be digitized. The stream of digitized instantaneous voltage values form the digital video data signal, which is addressed to the LCD, DMD, or other type of display object, to appropriately set pixels to blank (black) or to selected activated (non-black) status to replicate the image defined by the analog video data signal.

One problem with the above-described A/D conversion is that it is often imperfect due to errors in the pixel clock sampling of the analog signal. With reference to FIG. 1, since the pixel clock pulses 5 have "jitter" zones 6 at their leading and trailing edges, the clock pulses 5 should be registered with the centers of the pixel data components 2, so that the sampling is not randomly pushed by the jitter into the transition regions 3 of the analog video data signal 1. If the pixel clock pulses 5 are not properly registered, the resulting sampling imprecision gives rise to frequency (also know as "tracking") and "phase" errors, both of which introduce noise that may degrade the quality of the LCD, DMD, or other display object's image.

FIG. 2 illustrates a tracking error that results from the improperly setting of the number n of pixel clocks. As discussed above, the number n of pixel clocks should be equal to the number of pixel data components 2 of each horizontal line of analog video data signal 1. As illustrated, the improper setting of n results in the pixel data components 2 not being sampled at a consistent point. Specifically, n is set too large in clock signal 4' (i.e. the clock signal frequency is too high). The resulting crowding of the pixel clock pulses 5' yields an additive leftward drift of the pixel clock pulses 5' relative to the pixel data components 2 of the analog video data signal 1. Such drift causes sampling in the transition regions 3. For instance, as indicated by positional bracket A, the leading edges 7' of the third through the sixth clock pulses 5' sample in transition zones 3 of the analog video data signal 1. Accordingly, the transition zone data will be erroneous and the image information from adjacent non-sampled pixel data components 2 will be missing from the digitized video signal. If n is erroneously set large enough, the pixel clock pulses may be so crowded that individual analog pixel data components 2 may be double-sampled. On the other hand, if n is erroneously set too small (i.e. the pixel clock signal frequency is too low), the dispersion of the pixel clock pulses results in a rightward drift wherein sampling may also occur in the transition regions. In all of these cases, the erroneous sampling provides erroneous video signal data that generates unwanted distortion that degrades the LCD or other display object video image quality.

FIG. 3 illustrates that phase error may occur even when the pixel clock signal frequency equals the analog video data signal frequency (i.e. even when there is no tracking error). For example, as shown in pixel clock signal 4" in FIG. 3, the clock phase may be erroneously set such that every pixel clock pulse samples a transition region 3 of the analog video data signal. Leading edge jitter makes such phase error more likely, since if the jitter zones 6" straddle the intersections 8 of the pixel data components 2 and transition regions 3 of the analog video data signal 1, the voltage will be randomly sampled on either side of the intersection 8. In any case, phase error is undesirable since it generates unwanted phase noise, or "snow" in the LCD, DMD, or other display object video image.

Prior art techniques for reducing noise have focused on providing feedback to the pixel clock in order to eliminate the above-described tracking and phase errors. For example, a current projection display system may include an image capture circuit that automatically eliminates phase and tracking errors by monitoring the actual active image width of the analog video data signal measured by the number n of pixel clocks, and adjusting the frequency and phase components of the pixel clock signal until the expected width of the image matches the actual width. A current projection display system may also include an image capture circuit that automatically eliminates phase and tracking errors by monitoring a selected pixel data component at the edge of the central active video region that is horizontally stationary from frame to frame of the analog video data, and automatically iteratively adjusting the pixel clock pulse until a pixel clock pulse is centrally registered with the selected pixel data component. Both of these prior art techniques used in current projection display systems are described in U.S. Pat. Nos. 5,767,916 and 5,805,233, assigned to In Focus Systems, Inc. of Wilsonville, Oreg., the assignee of the present invention.

The image capture circuit of a current projection display system includes a programmable delay device, a PLL, a divide-by-n-counter, an A/D converter, and an ASIC (Application Specific Integrated Circuit) that contains the image edge or width detection circuitry that provides the feedback necessary to correct the pixel clock.

In operation, the A/D converter samples (reads) the instantaneous voltage value of the analog video data signal at the leading edge of each of the pixel clocks, thereby generating a series of sampled data signal values. The A/D converter then quantizes the sampled values by matching each value to one of a series of preselected voltage amplitude levels, which have corresponding numerical values. The numerical values are represented digitally and coded to establish 8-bit data for each of the colors, red, green, and blue. The three eight-bit color data signals are input through the three respective color data signal channels to the ASIC. A window random access memory (WRAM) is connected between the ASIC and the LCD, DMD, or other display object that ultimately receives the output from the A/D converter. At the display object, the coded color data signals set pixels to blank (black) or to specific activated (non-black) status corresponding to the sampled voltage level. A microcontroller, which is part of the current projection display system CPU, uses the feedback provided by the ASIC to control the programmable delay device and divide-by-n-counter to change the pixel clock settings and eliminate the phase and tracking errors.

Despite the above-described improvements in eliminating phase and tracking errors, current projection display systems are still not optimum. Particularly frustrating is the fact that the causes of the phase noise and distortion may dynamically change as the environment changes. Thus, any given technique for reducing or eliminating the distortion may or may not be effective from one moment to the next.

Another problem is that a digitized video frame representing the complete image displayed during the video frame period must be stored within the WRAM until it is transmitted to the display object. Since the video frames are typically stored in WRAM at a faster rate than they are transmitted to the display object, the WRAM must include enough frame buffer capacity or memory to store a number of video frames at once. For example, each video frame may be stored to the WRAM at the rate of 80 Hz (i.e. 80 frames per second), but may only be output to the display object at the rate of 60 Hz, as dictated by the refresh rate of the particular display object (e.g. the LCD, DMD, etc.).

For even the lowest resolution video display systems, storing video frames in WRAM results in the storage of a significantly large amount of data. Since a video frame represents the complete image, it contains data representing every pixel in the central active video region. The optical state of each pixel in the central active video region, i.e. its color or shade of gray, is described by several bits of data; the exact number of bits depends upon the desired number of colors or shades of gray that are to be displayed. For example, a typical LCD may have 480 rows and 640 columns that intersect to form a matrix of 307,200 pixels corresponding to the pixels in the central active video region. Consequently, if 8 bits are required to specify each of the three colors comprising each pixel, then 921,600 bytes of image data (3 bytes×307,200 pixels), or nearly 1 megabyte, are required to characterize a single digitized video frame.

The problem of having to provide a necessarily large WRAM storage capacity is compounded by the fact that the WRAM is expensive, which adds significantly to the cost of the multimedia projection display system. Additionally, the WRAM takes up a large amount of board space. Moreover, the sheer volume of digitized video frames generated by the multimedia projection display system requires a significantly large transmission bandwidth between the WRAM and the LCD, DMD, or other display object. Large transmission bandwidth requirements present a problem when designing networked presentation projector applications. For example, in a wireless network environment, including wireless networks designed in accordance with the IEE 802.11 Wireless LAN Standard, or the Draft Specification of Bluetooth: A Global Specification for Wireless Connectivity, promulgated by the Bluetooth Special Interest Group, or even in a conventional networked environment where the LCD, DMD, or other display object is capable of providing its own frame memory, it is desirable to reduce the transmission bandwidth requirements where possible to enable the development of networked presentation projector applications.

Accordingly, it is desirable to provide a multimedia projection display system that not only reduces the noise and distortion in the digitally sampled image, but also reduces the transmission bandwidth requirements between the WRAM and the display object.

SUMMARY

According to one aspect of the invention, a method is provided in which a digitally converted image is displayed free of phase noise and distortion and using a reduced amount of stored frame memory by displaying only a selected subset of the video frames that represent the digitally converted image. The selected subset is comprised of reference video frames, where a new reference frame is captured for display only after determining that a pixel of an inbound video frame exceeds a certain threshold of change as compared to a corresponding pixel of the previously captured reference frame.

In accordance with other aspects of the present invention, apparatus are provided for carrying out the above and other methods.

BRIEF DESCRIPTION OF DRAWINGS

The present invention will be described by way of exemplary embodiments, but not limitations, illustrated in the accompanying drawings in which like references denote similar elements, and in which:

FIG. 10 illustrates an example implementation in the form of a tabulation of a series of inbound frames and lines and the corresponding pixel value comparisons and resulting actions in accordance with one embodiment of the present invention.

FIG. 11 illustrates a pixel value comparison of individual red, green, and blue pixel values in decimal notation in accordance with one embodiment of the present invention.

DETAILED DESCRIPTION OF THE INVENTION

In the following description various aspects of the present invention, a method and apparatus for reducing phase noise and distortion in a digitally converted image, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known features may be omitted or simplified in order not to obscure the present invention.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Devices that generate digitally converted images generally refresh the screen display at rates of 60–80 Hz (60–80 frames per second) or more to provide a quality image and to avoid eye fatigue. However, the human eye perceives only a portion of the frames, approximately one every 16 milliseconds, or about 1/6th of the frames displayed at 60 Hz. Therefore, it is possible to reduce the number of frames sent to the device without impairing the perceived quality of the image. A reduction in the number of frames sent to the device is particularly desirable in a wireless network environment, or where the device is capable of providing its own frame memory, as it reduces the amount of bandwidth necessary to transmit the frame data between the multimedia projection display system and the display object.

The method of the present invention is based in part on the observation that selectively sending new frames only when there is a perceptively significant change in the frame data not only reduces the number of frames sent to the device, thereby reducing bandwidth requirements, but also improves the overall quality of the perceived image by eliminating unnecessary phase noise and distortion in the digitally converted image.

Figure 1:
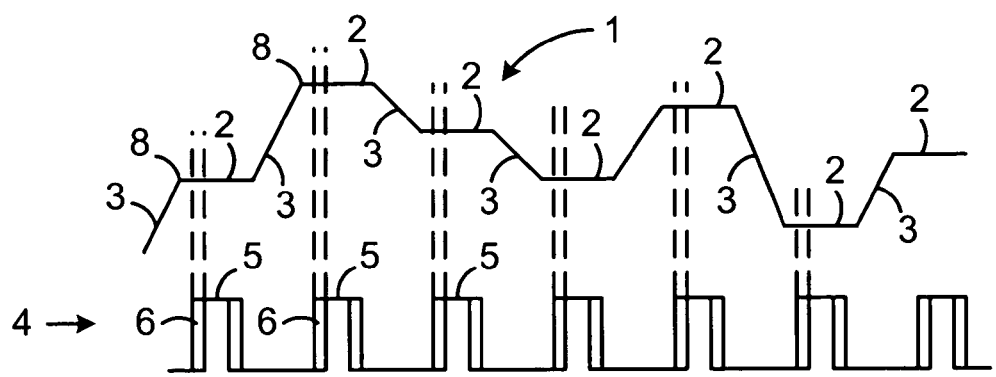
FIG. 1 depicts an analog video data signal waveform and a pixel clock signal waveform in a desired relationship where no tracking or phase error would be result.
Figure 2:
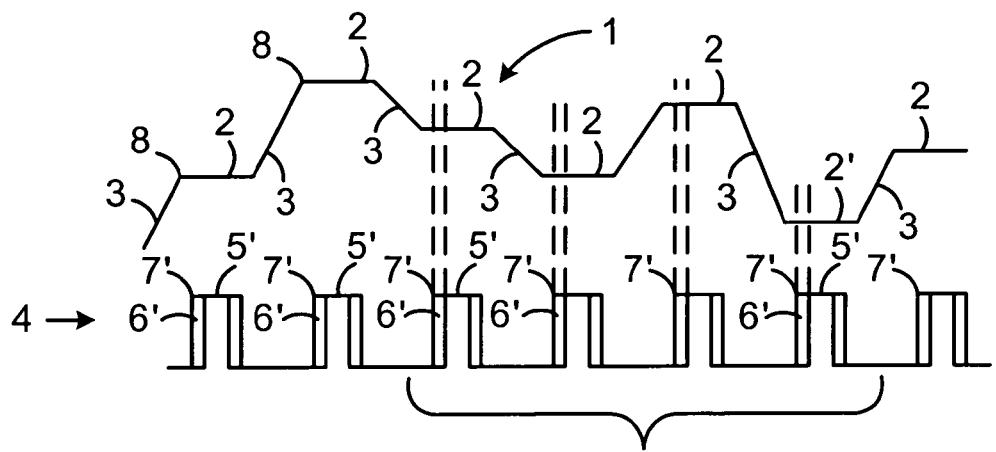
FIG. 2 depicts an analog video data signal waveform and a pixel clock signal waveform in a relationship where tracking error would result.
Figure 3:
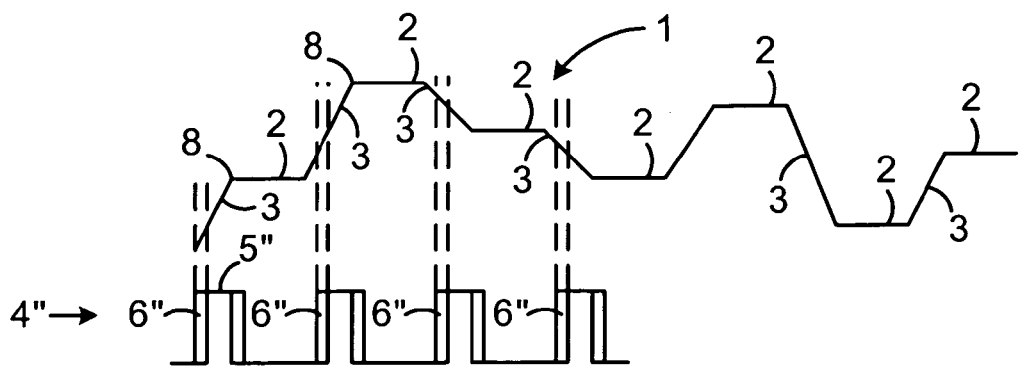
FIG. 3 depicts an analog video data signal waveform and a pixel clock signal waveform in a relationship where phase error would result.
Figure 4:
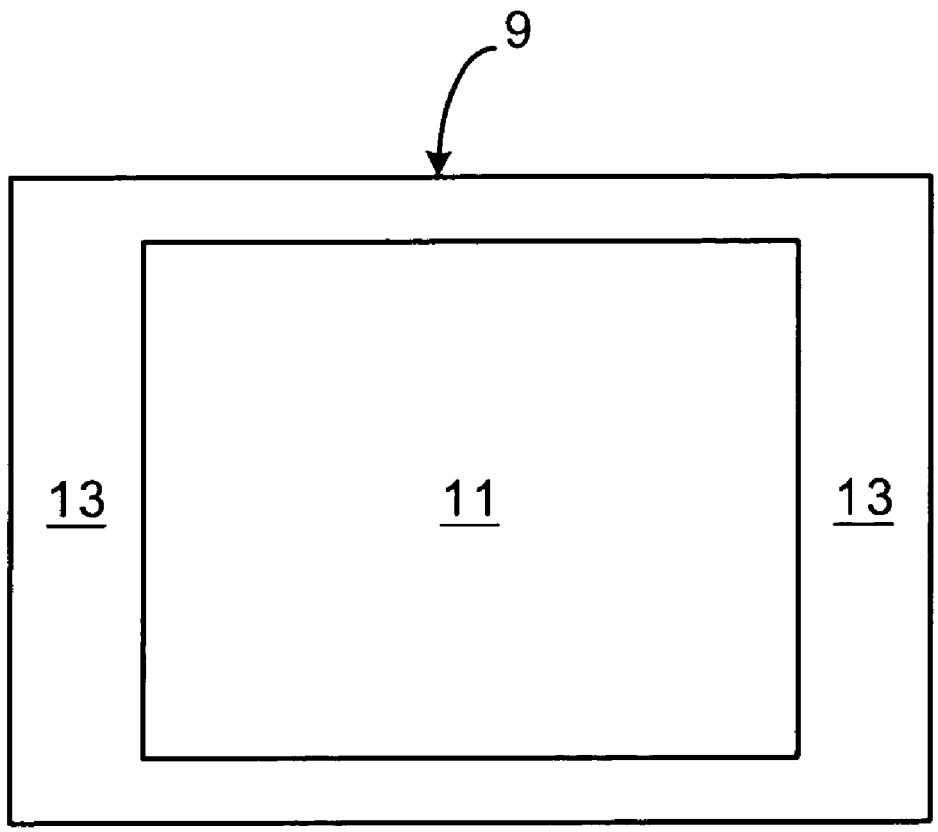
FIG. 4 depicts an exemplary video display, showing a central active video region surrounded by an inactive margin region.
Figure 5:
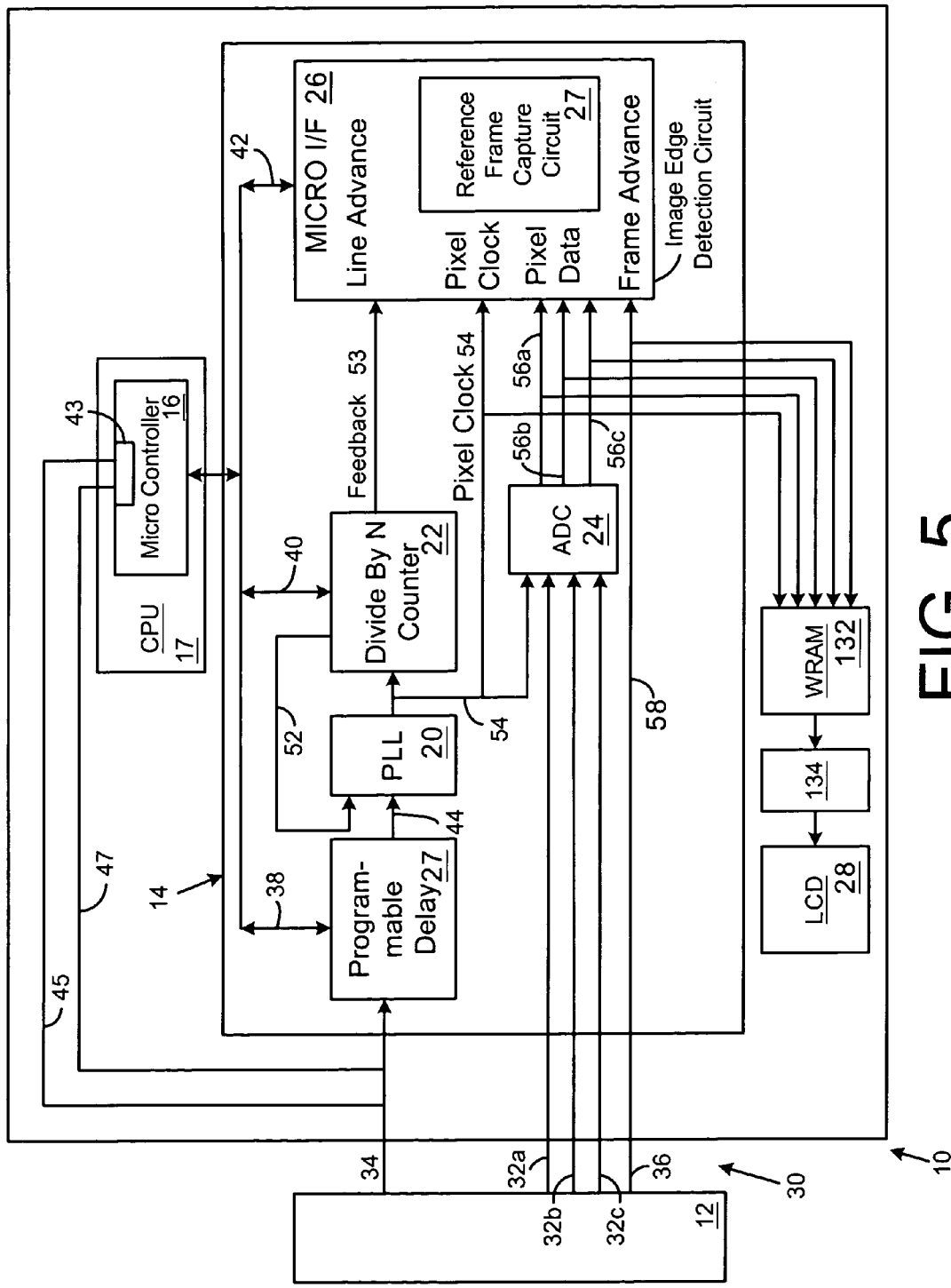
FIG. 5 is an overall schematic view of a multimedia source connected to a multimedia projection display system, further depicting a reference frame capture circuit in accordance with one embodiment of the present invention.

Referring now to FIG. 5, wherein an overall schematic view of a multimedia source connected to a multimedia projection display system depicting a reference frame capture circuit in accordance with one embodiment of the present invention is illustrated. As shown, the projection display system 10 includes an image capture circuit 14 that automatically eliminates phase noise, tracking error, and image distortion. A microcontroller 16, which is part of a display system CPU 17, controls the image capture circuit 14. In the illustrated embodiment, the image capture circuit 14 includes a programmable delay device 18, a PLL 20, a divide-by-n-counter (counter) 22, an A/D converter 24, and an ASIC (Application Specific Integrated Circuit) that contains an image edge detection circuit 26 and the reference frame capture circuit 27. The microcontroller 16 executes a firmware program that runs the ASIC circuits 26 and 27.

Turning to the signal path to the display object, such as an active matrix LCD 28, shown in FIG. 5, the line advance conductor 53, the digital video data signal channels 56a, 56b, 56c, and the frame advance conductor 58 are connected to an input port of a window random access memory (WRAM) 132. The WRAM has an output port connected to a display object control module 134, which in turn is connected to the LCD, DMD, or other display object 28. The connection between the WRAM output port and the display object control module 134 and LCD, DMD, or other display object 28, may be a conventional wired connection or a wireless network connection including, for example, a wireless network connection designed in accordance with the IEE 802.11 Wireless LAN Standard or in accordance with the Draft Specification of Bluetooth: A Global Specification for Wireless Connectivity, promulgated by the Bluetooth Special Interest Group. The LCD is preferably a 6.4 inch active matrix LCD, such as model LQ64P311 made by Sharp.

Based on the output of the image edge detection circuit 26 the microcontroller 16 further controls the delay device 18 and the counter 22 to eliminate phase noise and tracking errors. Based on the output of the reference frame capture circuit 27, the microcontroller 16 further controls the capture to frame memory in WRAM 132 of a reference frame from the frames output from the A/D converter 24 so as to eliminate phase noise and image distortion. The number of reference frames captured depends on the type of image being processed and a threshold setting such that the rate of capture of a reference frame is lower when the image is static (e.g. fixed image presentations), and higher when the image is dynamic (e.g. full motion video). The threshold setting is pre-selected to provide for the maximum elimination of phase noise and distortion, while providing a sufficient number of reference frames for proper replication of the digitally converted image at the display object 28. It should be understood that the outputs of the image edge detection circuit 26 and reference frame capture circuit 27 are both independent and complementary such that the reference frame capture circuit 27 may be used alone or in combination with the image edge detection circuit 26 or other methods to improve the quality of the digitally converted image displayed by the display object 28.

As shown in FIG. 5, for purposes of video signal transmission, the multimedia source 12 is connected to the projection display system 10 through a video source cable 30 which is shown in exploded schematic form. The cable 30 is of conventional design and includes multiple distinct conductors that are shielded together, including three separate channels 32a, 32b, 32c for carrying analog signals corresponding to red, green, and blue (RGB) color video components, and two conductors 34, 36 carrying the $H_{sync}$ and $V_{sync}$ signals, respectively.

Turning to the details of the image capture circuit 14, the microcontroller 16 is connected to the delay device 18 by a bus 38, to the counter 22 by a bus 40, and to the ASIC 26 by a bus 42. A mode identification counter 43, which is connected to $H_{sync}$ and $V_{sync}$ through conductors 45 and 47, respectively, may be located in the microcontroller or the ASIC. The mode identification counter 43 may also be provided independent of the microcontroller. A preferred microcontroller 16 is model MC6833 1, made by Motorola. The delay device has an input connected to the $H_{sync}$ conductor 34, and an output connected to the PLL through conductor 44. The preferred delay device is model No. DS10205-25, made by the Dallas Corporation.

Figure 6:
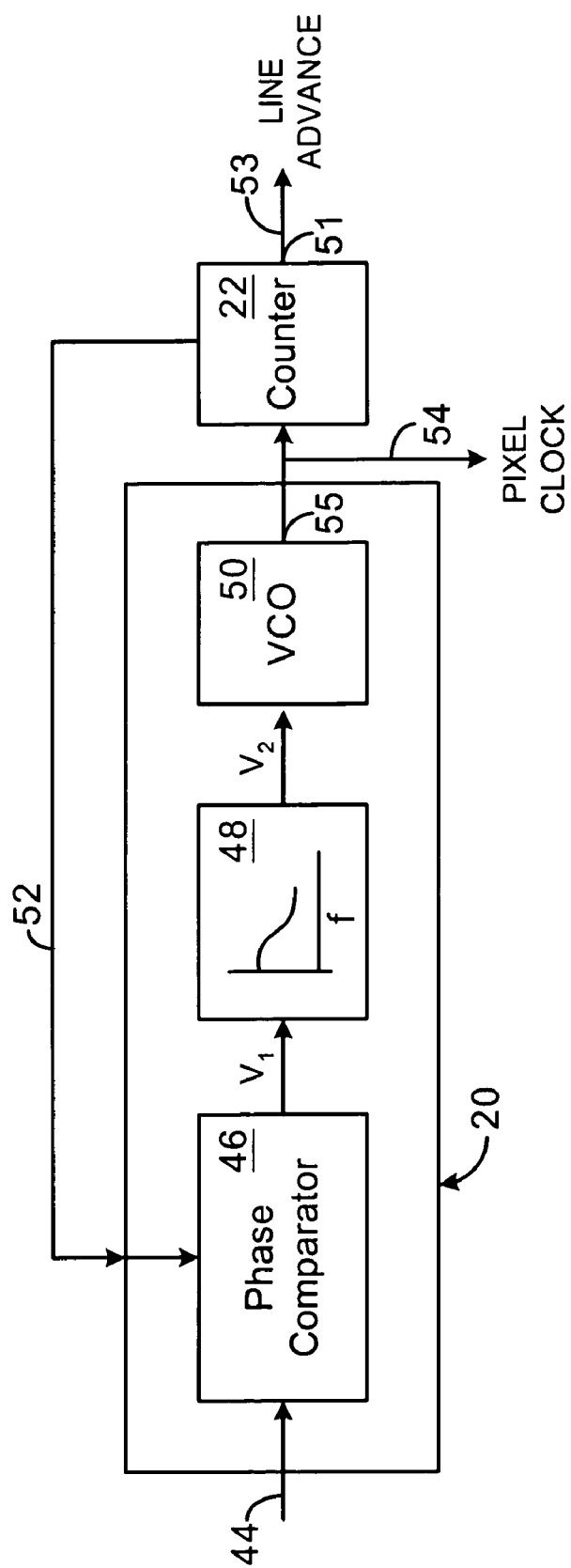
FIG. 6 is a schematic view of a phase-locked-loop (PLL) circuit used in analog video signal capture in accordance with one embodiment of the present invention.

As shown in detail in FIG. 6, the PLL 20 is of conventional design and includes a phase comparator 46, a low-pass filter 48, and a VCO pixel clock signal generator 50. A feedback loop 52 provided with the counter 22 connects the VCO output 55 and the phase comparator 46. The counter output 51 is connected to the ASIC 26 through a conductor 53, and the VCO output 55 is connected to the ASIC 26 and the A/D converter 24 through conductor 54. The preferred PLL is model ICS 1522 made by ICS. The counter is preferably a part of the ASIC 26.

Referring again to FIG. 5, the three analog video data signal channels 32a, 32b, 32c are connected to the A/D converter input. The A/D converter 24 includes three separate conventional A/D converters for digitizing each of the red, green and blue analog video data signals. Three color data signal channels 56a, 56b, 56c connect the A/D converter output to the ASIC 26 and 27. A preferred A/D converter is model 9542A made by the Raytheon Corporation. The $V_{sync}$ signal (frame advance signal) output of the multimedia source 12 is connected to the ASIC 26 and 27 through a frame advance conductor 58.

Figure 7:
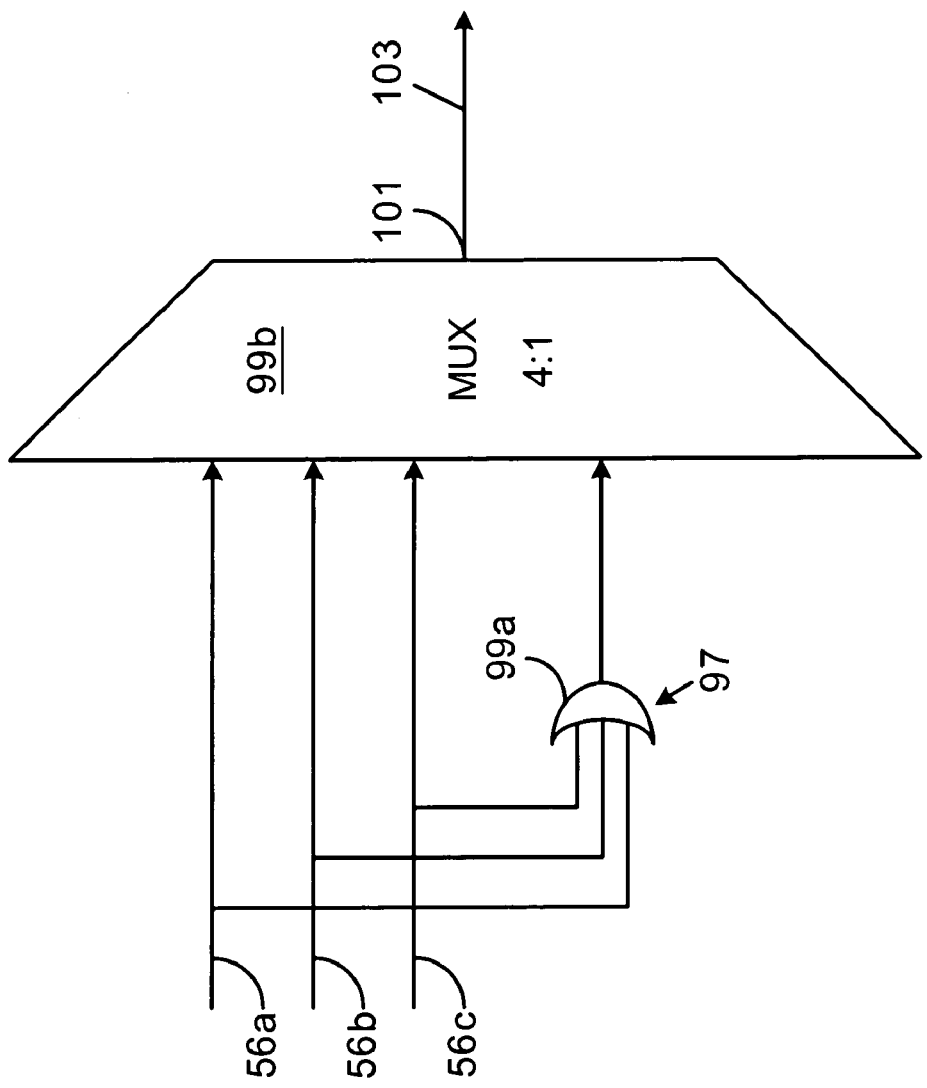
FIG. 7 schematically depicts a pixel value calculator in accordance with one embodiment of the present invention.

As shown in detail in FIG. 7, a pixel value calculator 97 has inputs receiving each of the RGB video data signal channels 56a, 56b, 56c. The RGB video data signals are connected in parallel to an "OR" gate 99a, and are connected to a 4:1 multiplexer 99b. The output of the OR gate 99a is also connected to the multiplexer 99b. The output 101 of the pixel value calculator 97 is connected through bus 103 to a pixel component value comparator in each of the image edge detection 26 and reference frame capture 27 ASIC circuits.

Figure 8:
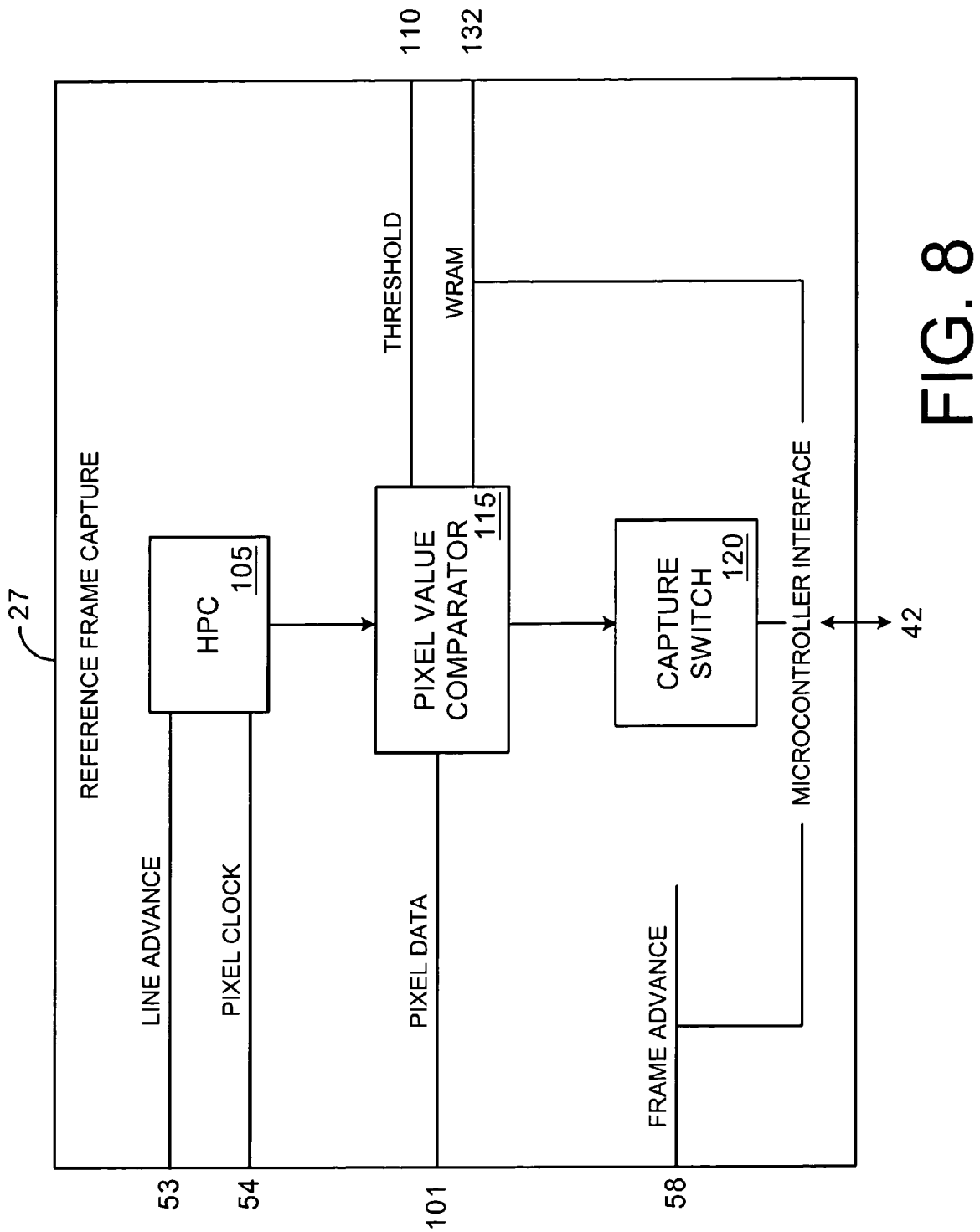
FIG. 8 is an block diagram of the logical components of the reference frame capture circuit shown in FIG. 5, in accordance with one embodiment of the invention.

Referring now to FIG. 8, wherein a block diagram overview of the functional components of the reference frame capture circuit 27 in accordance with one embodiment of the present invention is illustrated. As shown, the reference frame capture circuit 27 has a microcontroller interface connected to the microcontroller bus 42, and receives inputs from the line advance signal conductor 53, pixel clock signal conductor 54, and the $V_{sync}$ frame advance signal conductor 58. The reference frame capture circuit 27 also receives pixel data input 101 from the color data signal channels 56a, 56b, 56c, through the output 101 of the pixel value calculator 97. Access to a current reference frame in stored frame memory is provided through an input port of the WRAM 132. A horizontal position counter (HPC) component 105 uses input from the line advance conductor 53 and the pixel clock conductor 54 to determine the current pixel position of the pixel data input 101. The reference frame capture circuit 27 receives a threshold value input 110 used by a pixel value comparator component 115 to compare the pixel values of the pixel data input 101 to the corresponding pixel values of the lines of the current reference frame. The reference frame capture circuit 27 further includes a reference frame capture switch 120 to trigger the microcontroller 16 to capture a new reference frame to store in WRAM 132 stored frame memory for eventual transmission to display object 28.

Operation

In operation, the analog video signal is digitized in a manner set forth and described in U.S. Pat. Nos. 5,767,916 and 5,805,233. Referring now to FIG. 5, the display system 20 determines the resolution mode by a firmware program that uses the mode identification counter 43. $H_{sync}$ is input through conductor 45 to the mode identification counter 43 and the number of 50 MHz counter clocks over twenty $H_{sync}$ pulses is counted. In this way, an average number of clocks per line is obtained. $V_{sync}$ is input through conductor 47 in the mode identification counter 43 and the number of lines for each $V_{sync}$ pulse is obtained. The firmware then accesses a look-up table that determines resolution based on the number of 50 MHz clocks per twenty lines, and number of lines per frame.

Digitization of the analog video data signals occurs based on the n pixel clocks per line. Referring now to FIG. 5, the PLL 20, the VCO 50 generates the pixel clock signal, and the microcontroller 16 sets the counter 22 to generate a feedback pulse (line advance signal) once every n pixel clocks. Once n is selected, the PLL automatically adjusts to produce a line advance signal frequency corresponding to $H_{sync}$, and a pixel clock signal having a frequency of n times the line advance frequency.

The PLL works by the phase comparator 46 receiving the $H_{sync}$ signal from the delay device 18 through conductor 44, and receiving the feedback pulse signal through the feedback loop 52. The phase comparator 46 compares the frequencies of the $H_{sync}$ and the feedback pulse signal, generating an output voltage that is a measure of their phase difference. If the feedback pulse frequency does not equal the $H_{sync}$ frequency, the phase difference signal causes the VCO pixel clock frequency to deviate so that the feedback pulse frequency of the counter 22 deviates toward the $H_{sync}$ frequency.

Referring again to FIG. 5, the feedback pulse signal (line advance signal) of the counter 22 is directed to the ASIC 26 and 27 through a conductor 53, and the pixel clock signal of the VCO 50 is directed to the ASIC 26 and 27 and the A/D converter 24 through conductor 54. The line advance signal and $V_{sync}$ signal (frame advance signal) are conditioned to be one clock pulse in duration, through the use of a pulse edge detection circuit or the like.

The A/D converter 24 samples (reads) the instantaneous voltage value of the analog video data signal at the leading edge of each of the pixel clocks, thereby generating a series of sampled data signal values. The A/D converter 24 then quantizes the sampled values by matching each value to one of a series of preselected voltage amplitude levels, which have corresponding numerical values. These numerical values are then represented digitally and coded to establish 8-bit data for each of the colors red, green and blue.

Referring now to FIGS. 5 and 7, the three eight-bit color data signals are input through the three respective color data signal channels 56a, 56b, 56c to the pixel value calculator 97. The output 101 of the pixel value calculator 97 is connected through bus 103 to the reference frame capture circuit 27.

Using the output of the reference frame capture circuit 27, the microcontroller 16 controls the capture of a reference frame from the output of the A/D converter 24. The captured reference frame is stored in WRAM 132 for eventual transmission to the LCD, DMD, or other display object 28. At the display object 28, the coded color data signal sets pixels to blank (black) or to a specific activated (non-black) status corresponding to the sampled voltage level.

Referring now to FIG. 8, the output of the reference frame capture circuit 27 is a capture switch 120 that is set to on to instruct the microcontroller 16 to capture a new reference frame, or is set to off to prevent the microcontroller 16 from doing so. The $V_{sync}$ frame advance signal 58 generates a first inbound frame that is captured as the first reference frame and stored in stored frame memory in WRAM 132. The $V_{sync}$ frame advance signal 58 generates a subsequent inbound frame that is compared by the pixel value comparator 115 pixel-by-pixel to the pixel values of the first reference frame. The pixel value comparator 115 compares the absolute value of the difference between the inbound pixel value and the reference pixel value to a threshold value input 110. If the absolute value of the difference between any of the corresponding inbound and reference pixel values exceeds the threshold value input 110, then the pixel value comparator 115 generates a binary "yes" setting the capture switch 120 to on.

Referring now to FIGS. 7 and 8, in one embodiment the pixel value calculator 97 determines the value of each pixel by grouping the twenty-four total bits of each pixel together in eight groups of individual red, green and blue bits. Each of these groups of three bits is passed through the "OR" gate 99a, and the results of all of the eight "ored" groups and the digital RGB data signals are multiplexed in the 4:1 multiplexer 99b to establish a value for each pixel. It is contemplated that in another embodiment, the pixel value may be set in various other ways, including setting a separate value for one or each of the RGB digital data signals. In the latter case, the pixel value comparator 115 compares the absolute value of the difference between each of the RGB values of the inbound pixel and the reference pixel to the threshold value input 110. If the difference between any of the corresponding inbound and reference pixel RGB values exceeds the threshold value input 110, then the pixel value comparator 115 generates a binary "yes" setting the capture switch 120 to on.

Referring again to FIG. 8, the pixel value comparator 115 performs the pixel comparisons iteratively using the HPC 105 to step through every pixel in every line, and comparing the absolute value of the difference between each of the inbound pixel values and corresponding reference pixel values to the threshold value input 110. If the difference between any of the corresponding inbound and reference pixel values exceeds the threshold value input 110, then the capture switch 120 is set to on. After every pixel of every line of the inbound frame that triggered the capture has been completely processed, the capture switch 120 triggers the microcontroller 16 to capture a new reference frame. After capturing a new reference frame, the capture switch 120 is reset to off.

The entire process of capturing and comparing is repeated continually throughout the duration of the image conversion. The result is that the number of reference frames captured by the microcontroller 16 for storage in WRAM 132 and eventual display by display object 28 is a subset of the total number of inbound frames output by the A/D converter 24. Moreover, by selectively capturing an inbound frame only after determining that a preceding inbound frame exceeds a certain threshold of change, inbound frames whose pixel values are either static or that represent below-threshold changes that indicate phase noise or distortion can be eliminated.

Example Implementation

Figure 9:
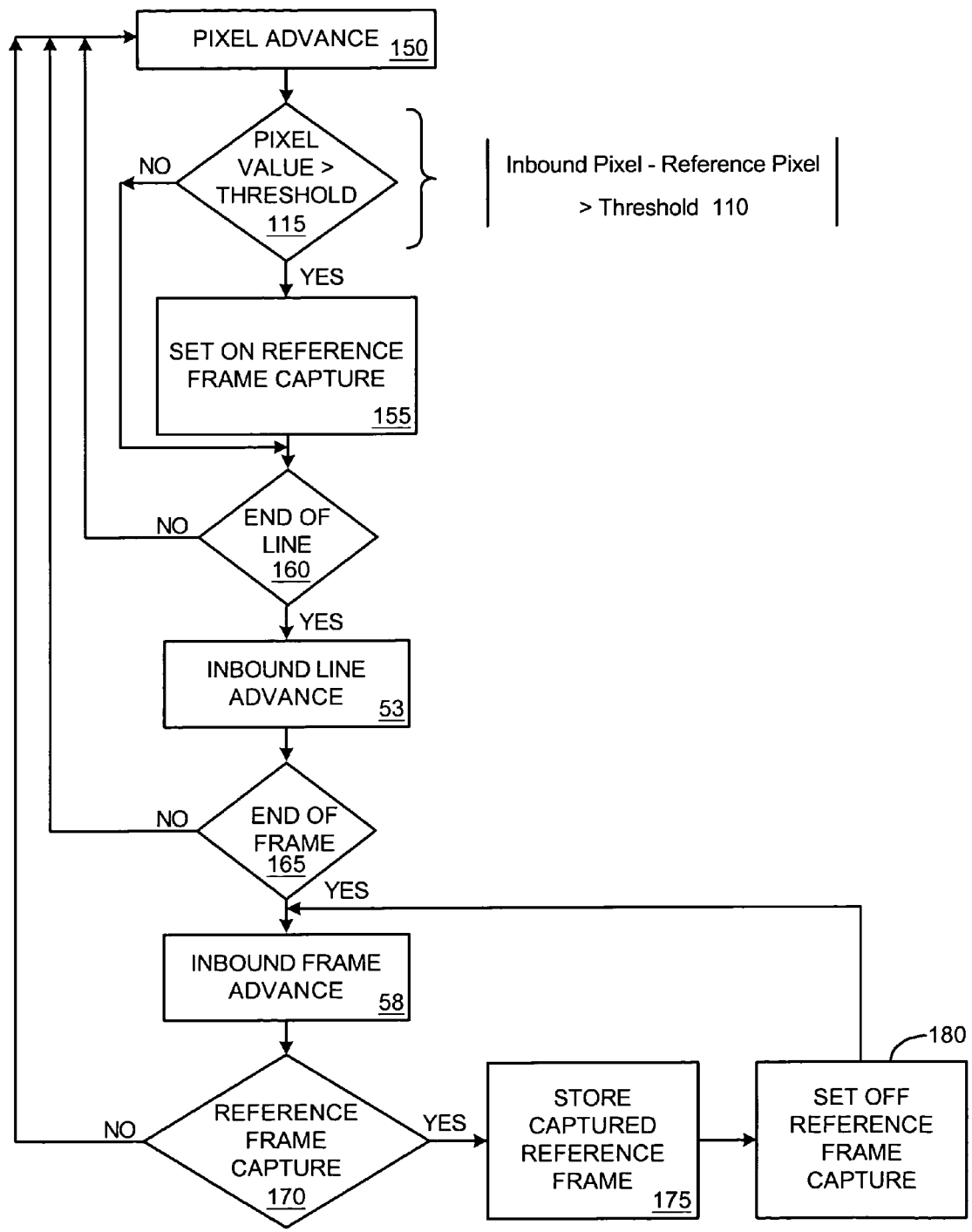
FIG. 9 is a flow diagram showing a reference frame capture method used in the reference frame capture circuit shown in FIG. 5, in accordance with one embodiment of the present invention.

An example implementation of a method for reducing phase noise and distortion in a digitally converted image based on reference frame capture will now be described. Referring to FIG. 9, wherein a flow diagram of a reference frame capture method used in the reference frame capture circuit 27 in accordance with one embodiment of the present invention is illustrated. As shown, after advancing the pixel position 150 using the HPC 105, the pixel value comparator 115 compares the absolute value of the difference between the inbound and reference frame pixel values to a preselected threshold value 110. If the threshold value 110 is exceeded, then the capture switch 120 is set to on 155; otherwise it remains set to off. If the end of the current line of the inbound frame 160 hasn't yet been reached, then the pixel position is again advanced 150, and the pixel value comparison 115 is repeated. However, if the end of the current line has been reached, then the next inbound line is first obtained using the line advance signal 53. If the end of the inbound frame 165 hasn't yet been reached, then the pixel position of the newly obtained next inbound line is advanced 150, and the pixel value comparison 115 is repeated, and so on. If, however, the end of the inbound frame has been reached 165, then the next inbound frame is obtained using the frame advance signal 58. If the capture switch 120 is set on 170, then the newly obtained next inbound frame is captured as the new reference frame and stored 175 in stored frame memory in WRAM 132. The capture switch 120 is reset to off 180, and another inbound frame is obtained using the frame advance signal 58. Since the capture switch 120 is now set to off, then the pixel position of the first line in the newly obtained inbound frame is advanced 150, and the pixel value comparison 155 is repeated, this time by comparing the inbound pixels to the pixels of the newly captured reference frame.

Referring now to FIG. 10, wherein a tabulation of a series of inbound frames and lines and the corresponding pixel value comparisons and resulting actions is illustrated in accordance with one embodiment of the present invention. As shown, each line is comprised of pixel values that range in value from hexadecimal zero ("0") to 255 ("FF"), with each value corresponding to one of 255 shades of the colors red, green, and blue.

The position of each pixel with a given line is indicated by the current value of the HPC 105. The threshold value in this example is pre-set to the value of 5. Lines 1–5 of frame 1 is stored as the first reference frame 175. The pixel values of the lines comprising inbound frame 2 are compared to the values of reference frame 1, however since none of the differences between the corresponding pixel values of the lines comprising frames 1 and 2 exceed the pre-set threshold of 5, no action results. For example, the pixels located in reference frame 1, Line 4, HPC 6 and inbound frame 2, Line 4, HPC 6 result in the pixel value comparison 115 as follows:

$$|2-3|=1$$

Likewise the pixels located in reference frame 1, Line 5, HPC 7 and inbound frame 2, Line 5, HPC 7 result in the pixel value comparison 115 as follows:

$$|3-3|=0$$

Since the difference of 1 and 0 do not exceed the threshold of 5, there is no change 176 sufficient to trigger the capture of a new reference frame.

Examining the same relative pixel locations in inbound frame 3232, however, yields a different result. This time, the pixels located in reference frame 1, Line 4, HPC 6 and inbound frame 3232, Line 4, HPC 6 result in the pixel value comparison 115 as follows:

$$|3-FF=FC$$

Likewise the pixels located in reference frame 1, Line 5, HPC 7 and inbound frame 3232, Line 5, HPC 7 result in the pixel value comparison 115 as follows:

$$|3-FF|=FC$$

Since the differences of FC do exceed the threshold of 5, the capture switch 120 is set on 155 to trigger a reference frame capture upon advancing to the next inbound frame.

As shown, advancing to the next inbound frame 3233 results in the action of storing 175 frame 3233 as the new reference frame against which subsequent pixel value comparisons will be based.

As noted earlier, in one embodiment, the individual RGB values are used as the pixel values by the pixel value comparator 115. Referring now to FIG. 11, an example of pixel values for an inbound 201 and reference 202 (stored) pixel are shown in decimal notation. The pixel value comparator 115 generates comparisons for the red color 203, the green color 204, and the blue color 205. As can be seen, only the blue color 205 comparisons result in a value of decimal "113" that exceeds the pre-set threshold of 5. This is sufficient, however, to trigger the capture and storage of a new reference frame 175.

Accordingly, a novel method and apparatus is described for reducing phase noise and distortion in a digitally converted image using a captured reference frame. From the foregoing description, those skilled in the art will recognize that many other variations of the present invention are possible. Thus, the present invention is not limited by the details described. Instead, the present invention can be practiced with modifications and alterations within the spirit and scope of the appended claims.

I claim:

1. An apparatus comprising:
   a frame conversion unit to convert frames of analog image data to frames of digital image data;
   a buffer coupled with the frame conversion to store the frame of digital image data and subsequent converted frames;
   a pixel value comparator coupled with the buffer to compare pixel data of the frame of digital image data and pixel data from the subsequent converted frame using horizontal position counter to compare and identify a subsequent converted frame having pixel data that differs from the pixel data of the frame of digital image data by a threshold amount;
   a capture switch configured to be set to on when the subsequent converted frame pixel data exceeds the threshold amount and where the capture switch is configured to be set to off when the subsequent converted frame pixel data is below the threshold amount;
   a microcontroller configured to capture the subsequent converted frame with pixel data that exceeds the threshold amount for storage to replace the frame of digital image data and display by a display object, and discard frames with pixel data that below the threshold amount.

2. The apparatus of claim 1 wherein the threshold amount is selected to maintain phase noise below a threshold.

3. The apparatus of claim 1 wherein the pixel value comparator is configured to compare a numerical value for each color of each pixel.

4. The apparatus of claim 1 wherein the pixel value comparator is configured to identify a subsequent converted frame where a numerical difference between the values of each color of the subsequent converted frame and the values of each color of the frame of digital image data exceeds a selected numerical value.

5. The apparatus of claim 3 wherein the color for each pixel comprises red, green, and blue.

* * * * *

UNITED STATES PATENT AND TRADEMARK OFFICE
CERTIFICATE OF CORRECTION

PATENT NO. : 6,989,823 B1
APPLICATION NO. : 09/653613
DATED : January 24, 2006
INVENTOR(S) : Alan Lasneski It is certified that error appears in the above-identified patent and that said Letters Patent is hereby corrected as shown below:

In column 6, line 40, delete "16" and insert --100-- therefor.

Signed and Sealed this

Eighth Day of July, 2008

JON W. DUDAS
*Director of the United States Patent and Trademark Office*